March 6, 1956  A. A. BOOTS ET AL  2,737,288
SERVING SYSTEM FOR CAFETERIAS
Filed Sept. 29, 1952  2 Sheets-Sheet 1

INVENTORS.
Arthur A. Boots
Oscar A. Boots
BY
ATTORNEY.

March 6, 1956 A. A. BOOTS ET AL 2,737,288
SERVING SYSTEM FOR CAFETERIAS
Filed Sept. 29, 1952 2 Sheets-Sheet 2

INVENTORS,
Arthur A. Boots
Oscar A. Boots
BY
ATTORNEY.

United States Patent Office 2,737,288
Patented Mar. 6, 1956

2,737,288

SERVING SYSTEM FOR CAFETERIAS

Arthur A. Boots and Oscar A. Boots, Carthage, Mo., assignors to Cafa-Roll, Inc., Carthage, Mo., a corporation Application September 29, 1952, Serial No. 312,032

3 Claims. (Cl. 198—181)

This invention has to do with fixtures and appliances for use in restaurants, cafes and the like, and has for its primary object to improve upon the food handling apparatus of co-pending application, Serial No. 166,677, filed June 7, 1950 and now Patent No. 2,666,519, and co-pending application Serial No. 312,029 filed on even date herewith entitled "Food Handling Structure For Restaurants," both in the name of Arthus A. Boots, one of the inventors hereof.

The inventions disclosed in the aforesaid applications and as will hereinafter appear in the present application, contemplate the provision of a continuous, movable conveyor assembly wherein is provided a continuous track for receiving a plurality of individual carriages advanced around the track in continuous succession. The carriages operably connected to a continuous chain belt or the like, are in turn provided with plates or platters of a suitable material such as stainless steel, upon which plates, dishes and other vessels of food are placed in the kitchen and are progressively brought to a point of accessibility by the customer. It must be initially understood therefore, that so far as the broad principles are concerned, it is immaterial whether the food is moved to a point adjacent a table or counter where eating takes place, or arranged in the form of a cafeteria where a customer may select food from the plates and thereupon proceed to tables or booths for purposes of eating.

While the structures set forth in the aforesaid applications are entirely satisfactory, it is highly desirable, if not absolutely necessary, that the carriages move smoothly and evenly without vibration, jerking or other disturbance. Except through the provision of improvements hereof, it is virtually impossible to assure such steady progression of the trays and the structure mounted thereon because of the path of travel that is to be preferred and the necessary movement of the drive chain over a plurality of idler sprockets therefor.

It is accordingly, the most important object of the present invention to provide in a conveyor system as above set forth, means to smooth out all fluctuations, vibrations and other disturbances as the carriages move in progression around the supporting track therefor.

Another object hereof is to include one or more rotatable weights operably connected with the continuous chain to avoid all jerking, lateral movement and vibration so that the food moves continuously and smoothly at an even predetermined rate of travel.

Another object hereof is to improve upon the means for mounting the carriages on the track and coupling the same with the driving chain, such objects, together with many important details of construction, all being made clear in the following specification, reference being had to the accompanying drawings, wherein.

Figure 1:
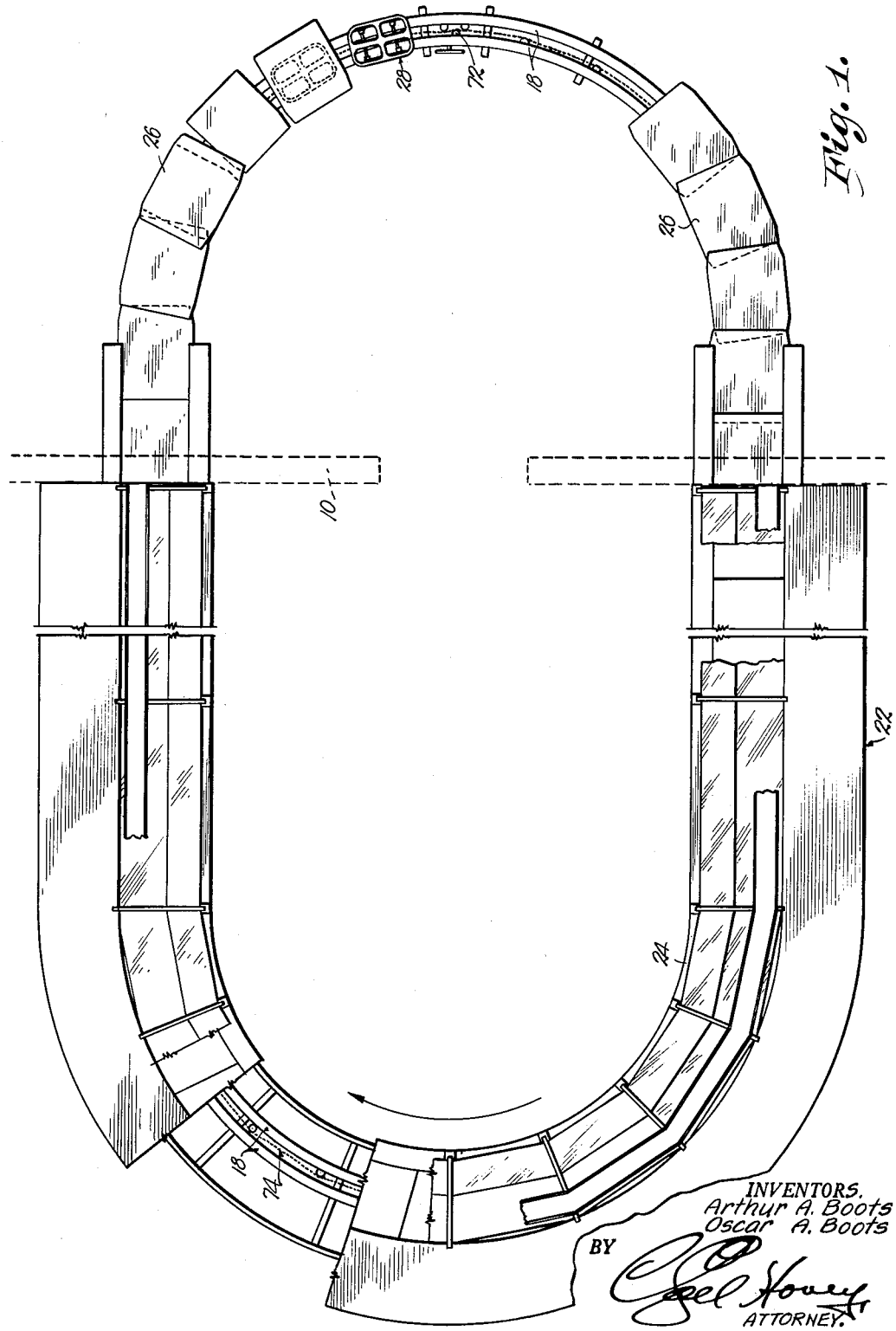
Figure 1 is a top plan view of a serving system for cafeterias or the like made pursuant to our present invention, parts being broken away to reveal details of construction.
Figure 2:
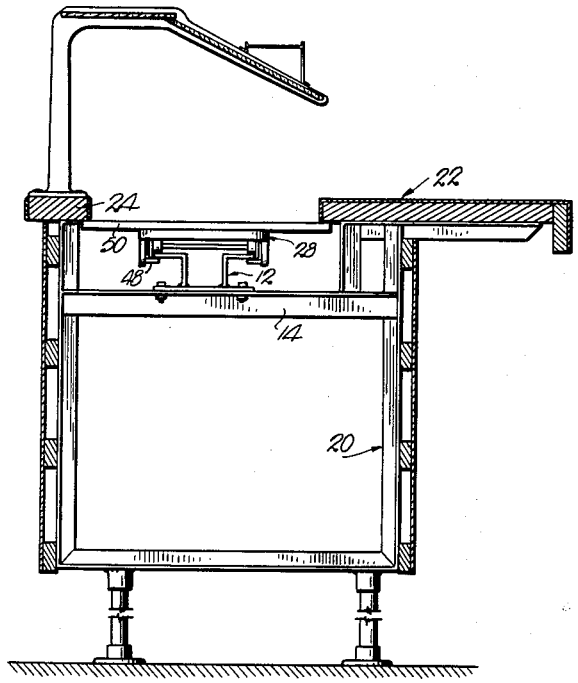
Fig. 2 is an enlarged, transverse, cross-sectional view through the structure shown in Fig. 1.

It is to be preferred that the continuous assembly shown in Fig. 1 of the drawings, be elliptical, and although there is illustrated a wall 10 extending transversely thereacross so that one portion of the assembly is disposed within the kitchen and the remainder thereof disposed within the dining room of the restaurant, it is manifest that the wall 10 may extend longitudinally of the continuous assembly if desired, and particularly if a cafeteria-style of serving is contemplated.

A continuous oblong track designated by the numeral 12, is mounted directly upon a plurality of cross-bars 14 and includes a pair of L-shaped track elements 16 presenting oppositely-extending, horizontal portions 18. The crossbars 14 are mounted on suitable framework broadly designated by the numeral 20, forming a part of counter structure that may take any suitable form and need not be described in detail for a full understanding of the invention hereof. The counter structure may include a table or ledge 22, and an inner strip 24, both of which preferably overlap the marginal edges of plates 26 that are preferably of stainless steel or other suitable material and forming a part of the individual units that include carriages 28 and which are operably connected with a continuous drive chain 30. The carriages 28 are adapted for support by the horizontal portions 18 of track 12 and include a polygonal frame 32 having a pair of wheel and axle assemblies, each of which includes an axle 34 and a pair of wheels or rollers 36. Frame 32 has a number of integral lugs 38 depending therefrom to provide bearings for the axles 34 releasably held in place by setscrews 40. Each of the rollers 36 has a cylindrical portion 42 that rests directly upon the track portions 18 as best illustrated in Fig. 3, and an out-turned annular flange 44 adapted to engage the outermost longitudinal edges of the track portions 18 to limit the extent of lateral movement of the carriages 28 on the track 12.

Figure 3:
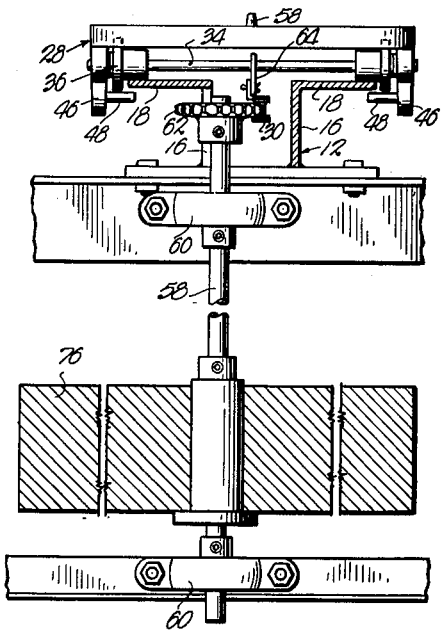
Fig. 3 is an enlarged, cross-sectional view taken through one of the dampening weights.

Frame 32 of each carriage 28 is likewise provided with a pair of down-turned ears 46 for receiving inwardly extending pins 48 that underlie the track portions 18 as shown in Fig. 3, to prevent accidental tipping of the carriages 28 relative to the track 12.

A filler block 50 preferably of wood, is interposed between the plate 26 and the frame 32, and block 50 as well as the plate 26 are releasably joined to the frame 32 by a single screw or other fastening element 52. Plate 26 is held against rotational movement with respect to block 50 by the provision of down-turned flanges 54 on plate 26 that overlap adjacent edges of the block 50. Block 50 is in turn held against rotational movement with respect to the frame 32 by the provision of openings 56 therein that receive up-turned studs 58 integral with the frame 32.

Figures 4, 5:
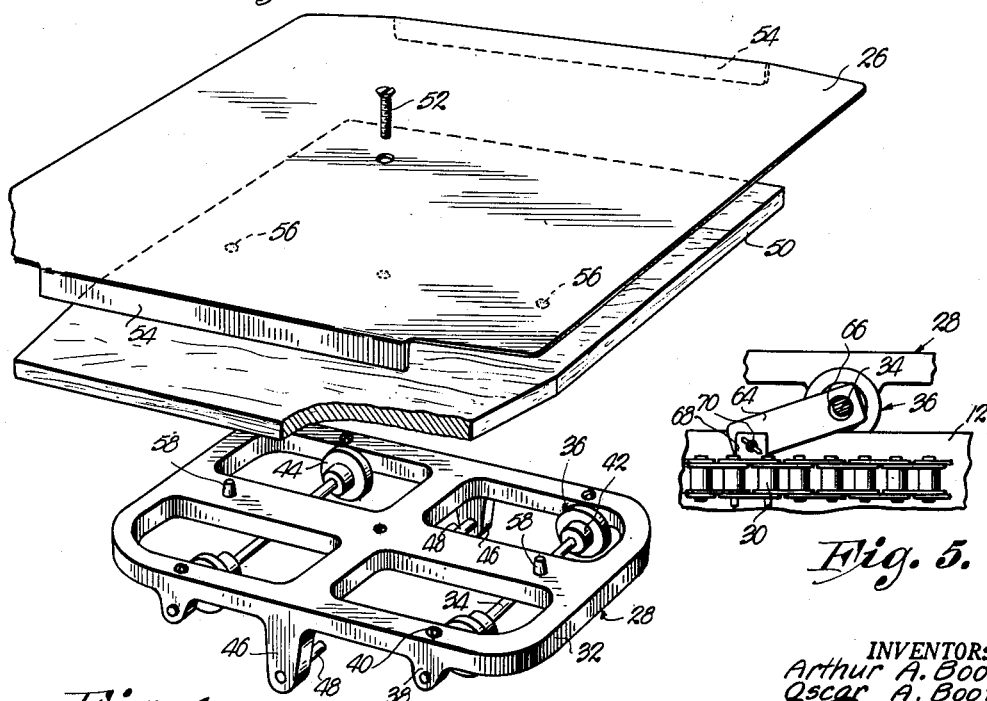
Fig. 4 is a stretched-out perspective view of one of the carriages and its associated structure removed from the supporting track.
Fig. 5 is a detailed, elevational view of the drive chain taken through the leading axle of one of the carriages and showing the link connection with the chain.

The frame 20 carries a plurality of spaced, vertical idler shafts 58 in bearings 60, each of which is in turn provided with a sprocket wheel 62 on the uppermost end thereof, continuous chain 30 being trained around the sprocket wheels 62. The carriages 28 are coupled in close succession with the chain 30 by a tongue in the nature of a short link 64 having an opening 66 therein appreciably larger than the forwardmost axle 34 of the carriage 28 which it receives (Fig. 5). The opposite end of the link 64 is pivotally connected with the chain 30 by means of an upstanding ear 68 on the latter and through the provision of a horizontal pivot 70.

As shown in Fig. 1 of the drawings, two of the sprocket wheels 62 are relatively close together and a drive sprocket wheel 72 connected with the chain 30 on the opposite side thereof, is driven by a suitable prime mover not shown.

Figure 1 of the drawings also illustrates that while the chain is generally elliptical, it is actually made up of a plurality of straight sections 74 between the sprocket wheels 62. By virtue of this fact, each time a link 64 moves rectilinearly from one sprocket wheel 62 to the next sprocket wheel 62 and thereupon around the latter, a perceptible jerk or fluctuation is seen in the corresponding carriage 28 and such unevenness of movement is carried out throughout the entire assembly. To compensate for such fluctuation and remove the same entirely, there is provided at least one, and preferably several, counterweights 76, each mounted on a shaft 58 for rotation therewith. The prime mover for driving the chain 30 and therefore, for advancing the plurality of carriages 28 around the track 12, also rotates the counterweights 76 and the momentum of the latter prevent variances in speed of movement of the carriages 28 as they move from sprocket wheel to sprocket wheel around the track 12. The provision of the weights 76, together with the refinements in constructions of the carriages 28 themselves and the coupling means 64, as well as the way in which the rollers 36 are associated with track 12, permit operation of the assembly at a desired speed that is so uniform, smooth and constant, the tube sectional characteristics of the individual units 28 are not easily recognized.

Having thus described the invention what is claimed as new and desired to be secured by Letters Patent is:

1. In a food handling system, a continuous, horizontal track; a series of carriages mounted for movement on the track; a continuous, movable chain coupled with the carriages for simultaneously moving the latter in procession around said track when the chain is moved; drive means operably coupled with the chain for moving the latter; a rotatable, vertical, idler shaft coupled with the chain for rotation thereby; and a rotatable flywheel mounted on the shaft and thereby operably coupled with the chain for smoothing out fluctuations in the latter.

2. In a food handling system, a continuous, horizontal track; a series of carriages mounted for movement on the track; a continuous movable chain coupled with the carriages for simultaneously moving the latter in procession around said track when the chain is moved; drive means including a driven vertical shaft coupled with the chain for moving the latter; a plurality of rotatable, vertical, idler shafts spaced around the track and coupled with the chain for supporting the latter and for rotation thereby; and a fly wheel mounted on a number of said idler shafts for smoothing out fluctuations in the chain.

3. In a food handling system as set forth in claim 2, wherein said track is provided with a pair of opposed, vertical edges and comprises a pair of spaced apart, cross-sectionally L-shaped members each having a vertical leg portion and an outwardly extending, horizontal leg portion; each carriage includes a pair of axle and roller assemblies, each roller having a portion resting on the track and a flange overlapping an edge of the track; said chain is disposed between the vertical leg portions of the members; and each carriage is provided with a vertical swingable tongue pivotally interconnecting the chain with an axle of one of the assemblies of the carriage adjacent the middle of said axle.

References Cited in the file of this patent

UNITED STATES PATENTS

| | | |
|---|---|---|
| 1,072,261 | Riddle | Sept. 2, 1913 |
| 1,376,444 | Lee | May 3, 1921 |
| 1,412,254 | Meyer | Apr. 11, 1922 |
| 1,928,934 | Green | Oct. 3, 1933 |
| 2,193,076 | Preble | Mar. 12, 1940 |